(12) United States Patent
Krause et al.

(10) Patent No.: US 7,490,714 B2
(45) Date of Patent: Feb. 17, 2009

(54) TRANSPORT DEVICE, IN PARTICULAR FOR USE IN A VACUUM CHAMBER

(75) Inventors: Jochen Krause, Dresden (DE); Michael Hofmann, Dresden (DE)

(73) Assignee: Von Ardenne Anlagentechnik GmbH, Dresden (DE)

( * ) Notice: Subject to any disclaimer, the term of this patent is extended or adjusted under 35 U.S.C. 154(b) by 262 days.

(21) Appl. No.: 11/411,650

(22) Filed: Apr. 26, 2006

(65) Prior Publication Data

US 2006/0260914 A1 Nov. 23, 2006

(30) Foreign Application Priority Data

May 23, 2005 (DE) .................. 10 2005 024 181

(51) Int. Cl.
*B65G 15/10* (2006.01)
(52) U.S. Cl. .................. 198/817; 198/837; 198/841; 414/217
(58) Field of Classification Search .......... 198/817, 198/688.1, 689.1, 841, 839; 414/217, 287, 414/327
See application file for complete search history.

(56) References Cited

U.S. PATENT DOCUMENTS

| | | | | |
|---|---|---|---|---|
| 4,457,419 A | * | 7/1984 | Ogami et al. ............ | 198/817 |
| 4,591,044 A | * | 5/1986 | Ogami et al. ............ | 198/817 |
| 4,804,081 A | * | 2/1989 | Lenhardt .................. | 198/689.1 |
| 5,878,868 A | * | 3/1999 | Gotoh et al. ............. | 198/689.1 |
| 6,164,432 A | * | 12/2000 | Monsees .................. | 414/798 |

FOREIGN PATENT DOCUMENTS

DE 197 14 271 A1 10/1998

* cited by examiner

*Primary Examiner*—James R Bidwell
(74) *Attorney, Agent, or Firm*—Heslin Rothenberg Farley & Mesiti P.C.

(57) ABSTRACT

A transport device is particularly suitable for use in a vacuum chamber for the transportation of a flat substrate through the vacuum chamber and comprises a belt conveyor with at least one flexible infinite belt guided around at least two deflection rollers, whereby at least one deflection roller can be driven, and further including a filling element positioned for filling at least the space contained by the infinite belt or belts. The air volume enclosed by the transport device is significantly reduced in comparison to conventional solutions by incorporating the filling element in the transport element. As a result, the volume to be evacuated from the vacuum chamber is reduced. The vacuum chamber can be evacuated and ventilated more rapidly. Nevertheless, the transport device is constructed so as to be maintenance-friendly. Maintenance work can be carried out easily, because the infinite belts and the deflection rollers are easily accessible. The transport device can also easily be upgraded in the case of existing vacuum chambers.

12 Claims, 3 Drawing Sheets

Figure 1:
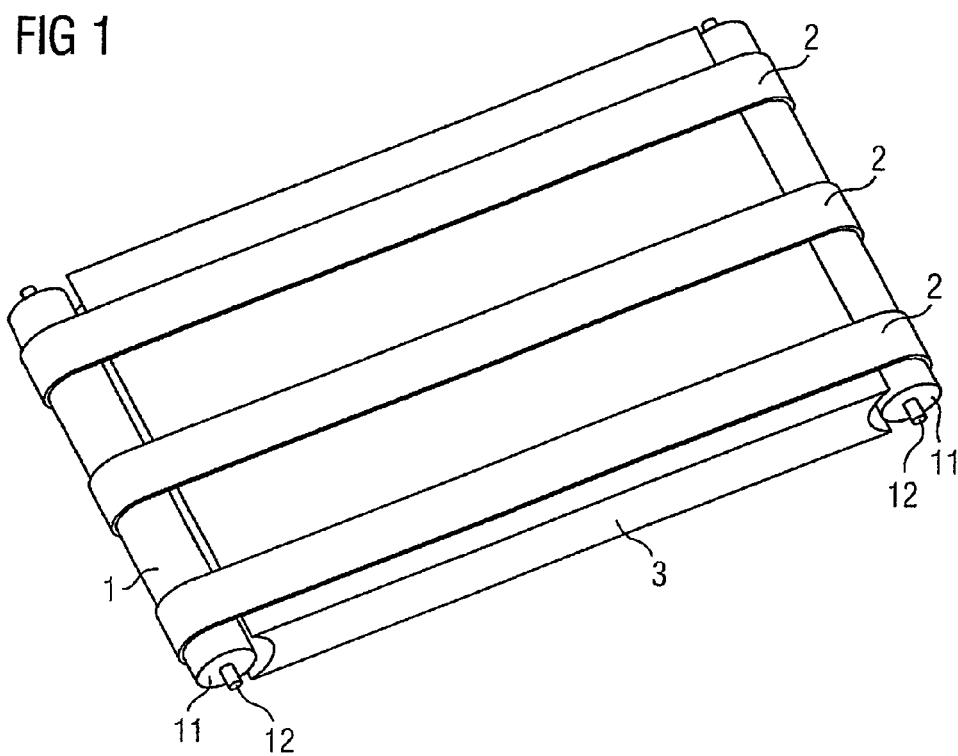

FIG 2
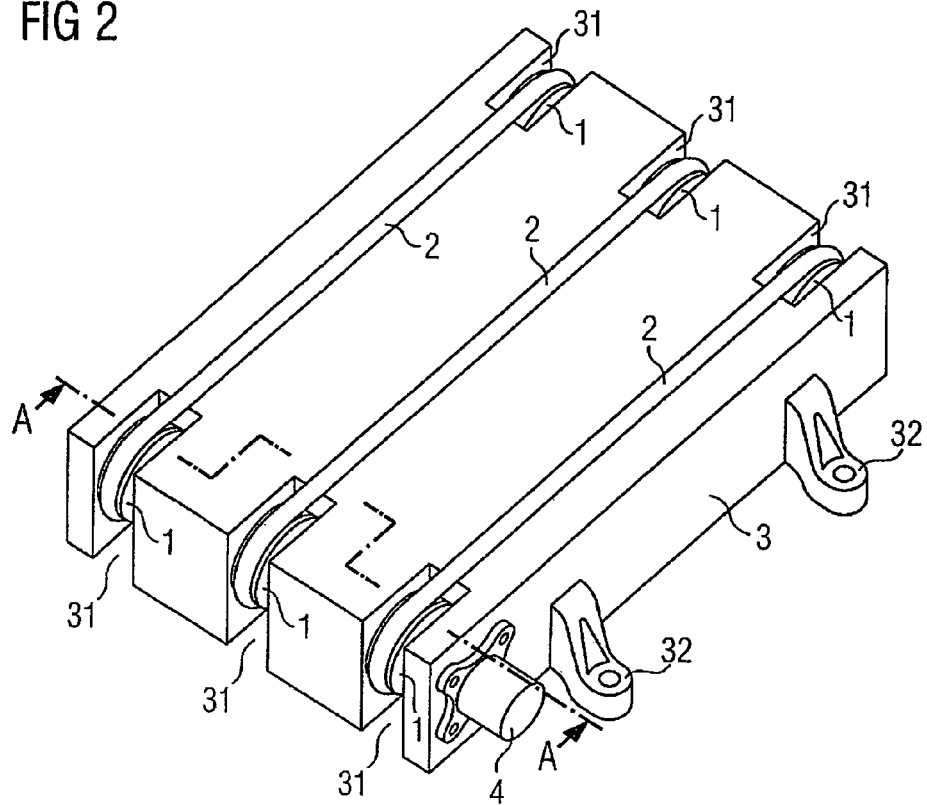
A-A
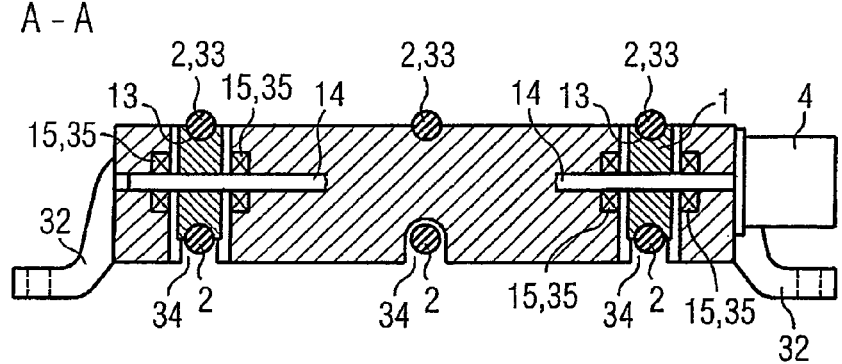

though the upper strand side (18) and lower strand side (26) are guided in grooves (17) in the base wall (4) of the vacuum chamber. A drawback to this solution is the high expense for production of the base wall of the vacuum chamber and the relatively high assembly expense for the transport facility, in particular during maintenance work.

TRANSPORT DEVICE, IN PARTICULAR FOR USE IN A VACUUM CHAMBER

BACKGROUND OF THE INVENTION

The invention concerns a transport device, in particular for use in a vacuum chamber for the conveyance of a flat substrate through the vacuum chamber.

In the industrial processing of flat substrates, for instance when coating flat glass panes in coating facilities, preferably magnetron sputter systems, ambient conditions divergent from the ambient air must frequently be created, for example an inert gas atmosphere or a vacuum. Upstream and downstream sluice chambers or buffer chambers must be provided for this for coupling to the process vacuum in in-line inert gas chambers. The generation and relief of the vacuum in the vacuum chamber of such a magnetron sputter system should occur as rapidly as possible and the vacuum should exhibit a specified minimum degree of evacuation, in order to attain the necessary processing speed in the coating system and an economically viable coating process.

Transport devices which comprise a number of driven deflection rollers or a belt conveyor with one or more flexible infinite belts guided around at least two driven deflection rollers are usually used for conveying the substrate through the vacuum.

These transport devices exhibit dimensions in a vertical direction, which are several times the thickness dimensions of the flat substrate. The space which the deflection rollers occupy in the sluice chamber, including the unused space between them, must be completely evacuated. This space considerably increases the volume to be evacuated of the vacuum chamber. The time necessary for evacuation (generation of the vacuum) or flooding of the vacuum chamber (return of the vacuum chamber to atmospheric pressure), and, in this regard, particularly for evacuation or flooding of the sluice chambers, as well as the energy consumption required for this, therefore increase when using such a transport device. Moreover, the degree of evacuation attainable decreases with increasing volume at unchanging pump power of the vacuum pumps used.

It is therefore necessary to provide vacuum pumps with high power capacities, as the speed of the evacuation of a sluice chamber is the cycle-determining element for operation of the overall system and the process safety essentially depends on the degree of evacuation attained.

In order to reduce the time necessary for evacuation, vacuum pumps can be used with increased suction power or with the volume of the sluice chamber reduced. The reduction in the volume of the sluice chamber is, however, restricted by the above requisite dimensions of the deflection rollers. The increase in the suction power of the vacuum pump, on the other hand, leads to a higher energy consumption and is therefore not economically viable and hence undesirable.

In DE 197 14 271, a proposal was made for a reduction of the volume required by the transport device, whereby the lower strand side (26) of the infinite belt is raised to the upper strand side (18) by means of deflection rollers (24, 25) spaced closely together, while the upper strand side (18) and lower strand side (26) are guided in grooves (17) in the base wall (4) of the vacuum chamber. A drawback to this solution is the high expense for production of the base wall of the vacuum chamber and the relatively high assembly expense for the transport facility, in particular during maintenance work.

BRIEF SUMMARY OF THE INVENTION

The task of the present invention therefore involves proposing a transport device, in particular in the area of the sluice chambers, of the type indicated above, in which the air volume enclosed by the transport device is as small as possible, in order to keep the total volume to be evacuated of the vacuum chamber as low as possible, and which is nevertheless constructed so as to make maintenance easier, as well as enabling location-independent operation and easy upgrading for existing vacuum chambers.

The task is solved in the sense of the present invention by a transport device with the features of Claim 1. Advantageous embodiments of the invention are the object of the subclaims.

The transport device according to the invention is particularly suitable for use in a vacuum chamber for the transportation of a flat substrate through the vacuum chamber and comprises a belt conveyor with at least one flexible infinite belt guided around at least two deflection rollers, whereby at least one deflection roller can be driven, and is characterized in such way that a filling element is also provided, which is positioned for filling at least the space contained by the infinite belt or belts.

Infinite belts in the sense of this patent application can have any cross-section. Depending on the application required, the technical expert will select the type best suited to his intended purpose from the known types of infinite belts, for instance a round belt with circular cross-section, a flat belt with a flat rectangular cross-section, a V-belt with a trapezoidal cross-section, a belt with T-shaped cross-section.

Deflection rollers in the sense of this patent application can be both cylindrical rollers, i.e. rollers with a length which is greater than the diameter, as well as wheel-shaped rollers, i.e. rollers with a length which is less than the diameter. Moreover, the term deflection rollers should refer to rollers of the above type with or without surface structure, i.e. grooves or beads running in a circumferential direction for guiding infinite belts, friction-increasing surface structures or flat surfaces.

The air volume enclosed by the transport device is significantly reduced in comparison to conventional solutions by incorporating the filling element in the transport element. As a result, the volume to be evacuated from the vacuum chamber, in particular the sluice chambers, is reduced. The vacuum chamber can be evacuated and ventilated more rapidly. Nevertheless, the transport device is constructed so as to be maintenance-friendly. Maintenance work can be carried out easily, because the infinite belts and the deflection rollers are easily accessible. The transport device according to the invention can also easily be upgraded in the case of existing vacuum chambers.

The filling element is an additional component of the transport device, i.e. it belongs to the transport device. In this way, the transport device is independent of an assembly surface, on which it is to be attached and can also be used without this and independently of it. When using the transport device according to the invention in a vacuum chamber, the vacuum chamber can exhibit a lightweight, straightforward-designed and cost-effective base wall typically produced from sheet metal.

The filling element advantageously exhibits bearing retainers for rotational suspension of the deflection rollers, and the deflection rollers are rotationally mounted on these bearing retainers.

Incorporation of the bearing retainers in the filling element enables the entire transport device with infinite belts and deflection rollers to form a compact assembly, which can be mounted and removed as an integral whole if required. This further simplifies maintenance work, in particular if the transport device is installed in a machine, such as a vacuum chamber for instance, as the components comprising the transport device are more easily accessible if the entire transport device can be removed from the machine.

A further advantage is to have several deflection rollers on a joint shaft mounted on the filling element, so that they can be driven by a joint drive mechanism.

This design enables in particular transport devices corresponding to the invention which exhibit several infinite belts and a pair of deflection rollers for each infinite belt. Each infinite belt is guided via two deflection rollers, one of which defines the start and the other the end of the transport route. Usually only one of the two deflection rollers, for instance the one located at the start of the transport route, is driven in such arrangements.

If all deflection rollers of the transport device located at the start of the transport route are now located on a joint shaft, all the infinite belts can be driven with only one drive mechanism, whereby the one end of the joint shaft is typically connected to an electric motor.

In an embodiment of the invention, at least one deflection roller is located in a recess of the filling element.

This is particularly advantageous in order also to force the air out of the space beside or between the deflection rollers through the filling element. A further reduction of the volume to be evacuated is attained by this.

Also advantageously, the filling element exhibits one or more grooves for guiding the infinite belt or belts.

One the one hand, the intermediate space beside or between the infinite belts is also at least partially filled by the filling element, whereby the volume to be evacuated is further reduced. On the other hand, the infinite belts receive a lateral guide, whereby inaccuracies are avoided when transporting the substrates. Especially advantageous are the grooves on the upper side of the filling element which are designed in such way that the infinite belts project over the groove and hence over the surface of the filling element. The grooves on the lower side of the filling element, on the other hand, can be realized so deeply for protection of the infinite belts that the infinite belts are completely retained in them.

In an embodiment of the invention, the filling element exhibits fastening element retainers for fastening the transport device onto an assembly surface.

This is especially advantageous if the other components of the transport device, such as infinite belts, deflection rollers, drive mechanism etc., are connected with the filling element to form a compact assembly. In this case, the transport device can be mounted in a straightforward manner on an assembly surface provided for this, for instance the base wall of a vacuum chamber. The individual components of the transport device exhibit specified positions to one another even before installation of the transport device, and do not require complex or time-consuming alignment and fixing in their relevant positions, such as would be necessary for independent assembly of the individual components. The entire transport device is only fastened on the fastening retainers.

The fastening retainers can typically be blind holes with internal thread, straps positioned on the side of the filing element with through-bores etc.

The fastening retainers are advantageously realized as spacing holders to an assembly surface.

The design of the fastening retainers as spacing holders entails an important advantage, in particular for use of the transport invention according to the invention in a vacuum chamber.

Until now, sluice chambers of coating systems have usually been flooded, i.e. ventilated, for coating flat substrates by a ventilation opening located on the upper side of the sluice chamber. The reason for this lies in the fact that a ventilation from the base wall of the vacuum chamber creates the danger that the flat substrate will be raised or even destroyed by the transport device.

With ventilation from the upper side of the sluice chamber, at least raising and lowering of the substrate no longer need to be feared, as the air flowing in only presses the substrate more firmly onto the transport device. Nevertheless, there is also a risk here that the substrate will be destroyed by the high pressure of the inflowing air. This is currently countered by providing an impact plate between the ventilation opening on the upper side of the sluice chamber and the transport device or the flat substrate lying on this. This impact plate absorbs the pressure of the inflowing air and then initially distributes this parallel to the transport plane. In this way, the pressure of the inflowing air exerted on the substrate is reduced to such an extent that the substrate cannot be destroyed.

With ventilation of the transport device corresponding to the invention close to the base wall of the vacuum chamber, i.e. with a specifiable gap which is defined by the design of the fastening retainers as spacing holders, the vacuum chamber can be ventilated from the base wall without entailing any hazard. The air flowing in through a ventilation opening provided below the transport device in the base wall initially all encounters the filling element and is consequently distributed parallel to the transport plane of the substrate in the gap between the base wall and filling element defined via the fastening elements. The substrate can be neither raised nor destroyed by the inflowing air.

Alternatively or additionally, the filling element can exhibit one or more channels for air distribution on its lower side, so that inflowing air is rapidly and effectively distributed in the vacuum chamber. Such channels can typically be designed as grooves or boreholes.

Particularly advantageous is the use of the transport device corresponding to the invention in a vacuum chamber, whereby the transport device is located above a ventilation opening located in a base wall of the vacuum chamber, which enables the penetration of air through the ventilation opening into the vacuum chamber.

BRIEF DESCRIPTION OF THE DRAWING FIGURES

Figure 3:
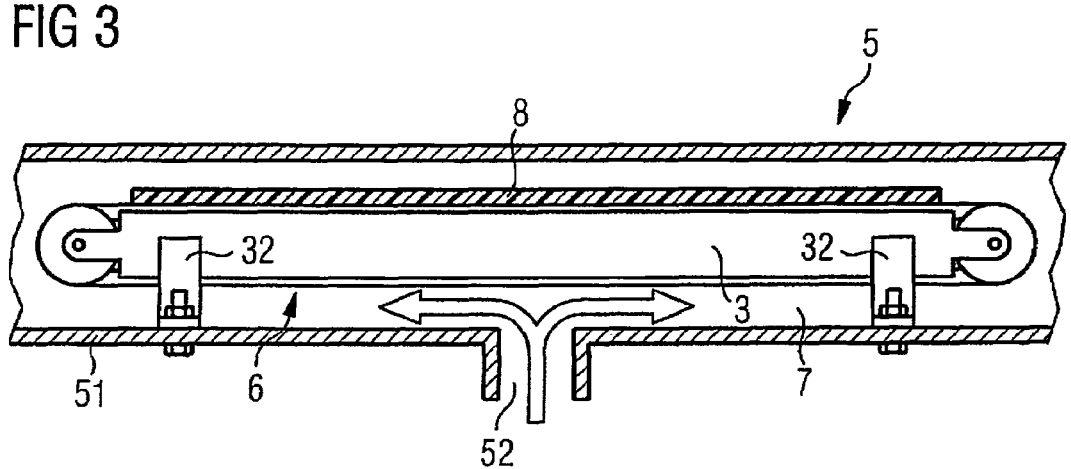

The invention will be explained in more detail below on the basis of embodiment examples and accompanying drawings. At the same time, FIG. 1 shows a transport device corresponding to a first embodiment example, FIG. 2 shows a transport device corresponding to a second embodiment example and FIG. 3 shows the use of the transport device corresponding to the invention in the vacuum chamber of a coating system.

DETAILED DESCRIPTION

FIG. 1 shows a simple design of the transport device corresponding to the invention.

The transport device comprises two deflection rollers 1, three infinite belts 2 and a filling element 3.

The deflection rollers 1 are designed cylindrically. They serve for guiding and driving all three infinite belts 2, which exhibit a flat rectangular cross-section in the embodiment example. The deflection rollers 1 consist of a cylindrical rotor 11, which is rotationally mounted on an axle 12. The axle 12 projects out from the rotor 11 on both sides, with the result that the deflection rollers 1 can be mounted on these free ends of the axles 12. The suspension itself is not shown in the figure.

The filling body 3 is located between the space enclosed by the deflection rollers 1 and the infinite belts 2. This exhibits a more or less cuboid shape. Only the sides of the filling element 3 facing the deflection rollers 1 are designed concavely, so that these sides of the filling element 3 come as close as possible to the deflection rollers 1 at the entire height of the filling body 3 in order to include as large a part of the enclosed volume as possible.

FIG. 2 shows an improved design of the transport device corresponding to the invention.

The transport device comprises six deflection rollers 1, three infinite belts 2 and a filling element 3.

The deflection rollers are designed so as to be wheel-shaped. Each pair of deflection rollers serves for guiding and driving one of the three infinite belts 2 which exhibit a circular cross-section in the embodiment example. The deflection rollers 1 exhibit a semicircular circumferential groove 13 for holding the infinite belt 2.

Three of the six deflection rollers 1 are located respectively on each end of the filling element. They therefore define the start or end of the transport routes which can be realized with the transport device. Each of these two groups of three deflection rollers 1 exhibits a common shaft 14 on which the deflection rollers 1 are mounted. The shaft 14 is mounted with rolling bearings in a borehole of the filling element 3. The rolling bearings 15 are located in the bearing retainers 35 of the filling element 3 provided for this.

Arrangement of the several deflection rollers 1 on a joint shaft 14 means that these can be driven by a joint drive mechanism 4 which is an electric motor with integrated gears in the embodiment example. The drive mechanism 4 is located on the side of the filling element 3 and connected to the joint shaft 14.

Each deflection roller 1 is located in a recess 31 of the filling element 3 provided for this, so that the space between the deflection rollers 1 is also filled by the filling element 3.

The filling element 3 is located between the space enclosed by the deflection rollers 1 and the infinite belts 2 and exhibits more or less a cuboid basic shape. This basic shape is only interrupted by the recesses 31 and the grooves 33 and 34.

At the same time, the upper groove 33 is designed in such a way that it exhibits a semi-circular cross-section. The upper strand side of the infinite belt 2 running in the upper groove 33 therefore projects about halfway out of the upper groove 33 beyond the upper side of the filling element 3, so that no contact can result between a substrate lying on the strand side of the infinite belt 33 and the filling element 3.

The lower groove 34, however, is realized so deeply that the lower strand side of the infinite belt 2 is protected against damage on the lower side of the filling element 3.

Two fastening retainers 32 for mounting the transport device on an assembly surface are located on each longitudinal side of the filling element 3. In the embodiment example, the fastening retainers 32 are realized as straps each with a through-bore.

As can be seen from FIG. 2, in particular the section diagram A-A, the fastening retainers 32 are realized as spacing holders to an assembly surface, whereby the outer area of the straps is cranked downwards to below the lower side of the filling element. In this way, a gap is defined between the lower side of the filling element 3 and the assembly surface, for instance the base wall of a vacuum chamber.

FIG. 3 shows the preferred use of the transport device corresponding to the invention in the vacuum chamber of a coating system.

The vacuum chamber 5 is a closed space capable of being evacuated, which is surrounded by walls made of sheet metal. A ventilation opening 52 is provided in the base wall 51, which can also be used as a ventilation opening when evacuating the vacuum chamber 5, if required.

A transport device 6 with a filling element 3 for transporting flat substrates 8 through the vacuum chamber 5 is located on the base wall 51 of the vacuum chamber 5 above the ventilation opening 52. As a result of the fastening retainers provided on the transport device 6 and serving to fasten the transport device on the base wall 51 of the vacuum chamber 5, a gap 7 is defined between the base wall 51 and the transport device 6.

If a vacuum chamber 5 is ventilated by letting in air through the ventilation opening 52, the inflowing air will thus encounter the filling element 3 of the transport device 6 and is distributed from this parallel to the transport plane of the substrate 8 in the vacuum chamber 5. As a result, the substrate 8 cannot by raised or destroyed by the inflowing air.

The invention claimed is

1. Transport device, for use in a vacuum chamber, for conveyance of a flat substrate through the vacuum chamber, comprising a belt conveyor with at least one flexible infinite belt guided around at least two deflection rollers, wherein at least one deflection roller can be driven, and a filling element for filling substantially all space enclosed by the at least one infinite belt and the deflection rollers.

2. Transport device according to claim 1, wherein the filling element comprises bearing retainers for rotational suspension of the deflection rollers, and the deflection rollers are rotationally mounted on these bearing retainers.

3. Transport device according to claim 1, wherein several deflection rollers are located on a joint shaft mounted on the filling element, so that several deflection rollers can be driven by a joint drive mechanism.

4. Transport device according to claim 1, wherein at least one deflection roller is located in a recess of the filling element.

5. Transport device according to claim 1, wherein the filling element includes one or more grooves for guiding the at least one infinite belt.

6. Transport device according to claim 1, wherein the filling element includes fastening element retainers for fastening the transport device onto an assembly surface.

7. Transport device according to claim 6, wherein the fastening retainers are realized as spacing holders to an assembly surface.

8. Transport device according to claim 1, wherein the filling element additionally includes one or more channels for air distribution on a lower side of the filling element.

9. Method of using the transport device of claim 1, wherein the transport device is located above a ventilation opening located in a base wall of the vacuum chamber, which enables penetration of air through the ventilation opening into the vacuum chamber.

10. Transport device of claim 1, wherein the belt conveyor includes at least two spaced apart flexible infinite belts separated by an intermediate space, and the filling element fills substantially all space enclosed by each infinite belt and the deflection rollers.

11. Transport device of claim 1, wherein the filling element has a generally cuboid basic shape.

12. Transport device of claim 1, wherein the filling element also fills at least partially the intermediate space.

* * * * *